(12) United States Patent
Schuft

(10) Patent No.: US 9,586,329 B2
(45) Date of Patent: Mar. 7, 2017

(54) SKINNING KNIFE WITH REMOVABLE BLADE

(71) Applicant: Fiskars Brands, Inc., Madison, WI (US)

(72) Inventor: Peter Schuft, Portland, OR (US)

(73) Assignee: Fiskars Brands, Inc., Middleton, WI (US)

( * ) Notice: Subject to any disclaimer, the term of this patent is extended or adjusted under 35 U.S.C. 154(b) by 268 days.

(21) Appl. No.: 14/302,985

(22) Filed: Jun. 12, 2014

(65) Prior Publication Data

US 2014/0366387 A1 Dec. 18, 2014

Related U.S. Application Data

(60) Provisional application No. 61/834,694, filed on Jun. 13, 2013.

(51) Int. Cl.
*B26B 5/00* (2006.01)
*A22B 5/16* (2006.01)

(52) U.S. Cl.
CPC .............. *B26B 5/001* (2013.01); *A22B 5/168* (2013.01); *B26B 5/00* (2013.01); *B26B 5/003* (2013.01)

(58) Field of Classification Search
CPC .... B26B 1/08; B26B 1/00; B26B 5/00; B26B 5/002; B26B 5/003; B26B 1/04; A22B 5/168; A61B 17/3213; A61B 17/3211; A61B 17/32113
USPC .......... 30/162, 156, 286, 335, 337, 339, 338
See application file for complete search history.

(56) References Cited

U.S. PATENT DOCUMENTS

| | | | | |
|---|---|---|---|---|
| 2,107,736 A | * | 2/1938 | Huber | B26B 5/006 30/162 |
| 2,109,108 A | | 2/1938 | Fesler | |
| 2,316,985 A | | 4/1943 | Niedermayer | |
| 3,448,518 A | * | 6/1969 | Sklar | B26B 5/002 30/162 |
| 3,660,895 A | * | 5/1972 | West | B26B 5/005 30/162 |
| 3,863,339 A | * | 2/1975 | Reaney | B26B 5/001 30/162 |
| 3,896,546 A | | 7/1975 | Hildebrandt | |
| 4,292,738 A | | 10/1981 | Osada | |
| 4,466,377 A | | 8/1984 | Kolb et al. | |
| 4,660,287 A | | 4/1987 | Decker | |
| 4,798,000 A | | 1/1989 | Bedner et al. | |
| 4,930,220 A | | 6/1990 | Loo | |
| 5,475,925 A | * | 12/1995 | Newman | B26B 5/001 30/162 |

(Continued)

*Primary Examiner* — Jennifer Swinney
(74) *Attorney, Agent, or Firm* — Foley & Lardner LLP

(57) ABSTRACT

A skinning knife includes a handle, a blade carrier coupled to the handle, the blade carrier including a mount having a mounting surface, a boss extending outward from the mounting surface, and a spring including a front portion, a middle portion, and a rear portion, the front portion secured to the mount, the middle portion bent outward from the front portion and the rear portion, and the rear portion including a free end of the spring movable relative to the mount, and a blade including a sharpened edge, a body, a slot formed through the body, and the slot includes a narrow portion and a wide portion, The blade is releasably secured to the blade carrier by interaction between the boss and the spring of the blade carrier and the slot of the blade.

15 Claims, 20 Drawing Sheets

(56) References Cited

U.S. PATENT DOCUMENTS

| | | | |
|---|---|---|---|
| 5,527,329 A | 6/1996 | Gharibian | |
| 5,664,792 A | 9/1997 | Tseng | |
| 6,357,120 B1* | 3/2002 | Khachatoorian | B26B 5/001 30/162 |
| 6,510,612 B1* | 1/2003 | Cybulski | B26B 5/002 30/162 |
| 6,574,868 B1 | 6/2003 | Overholt | |
| 7,716,839 B2 | 5/2010 | Onion et al. | |
| 8,074,364 B2 | 12/2011 | Nakamura | |
| 8,413,339 B2 | 4/2013 | Ranieri et al. | |
| 2005/0252010 A1 | 11/2005 | Freeman | |
| 2007/0277382 A1* | 12/2007 | Okada | B26B 5/003 30/162 |
| 2008/0250650 A1* | 10/2008 | Seber | B26B 5/001 30/161 |
| 2009/0235535 A1* | 9/2009 | Circosta | A47L 13/08 30/162 |
| 2014/0115851 A1* | 5/2014 | Bloch | B26B 9/00 29/402.08 |

* cited by examiner

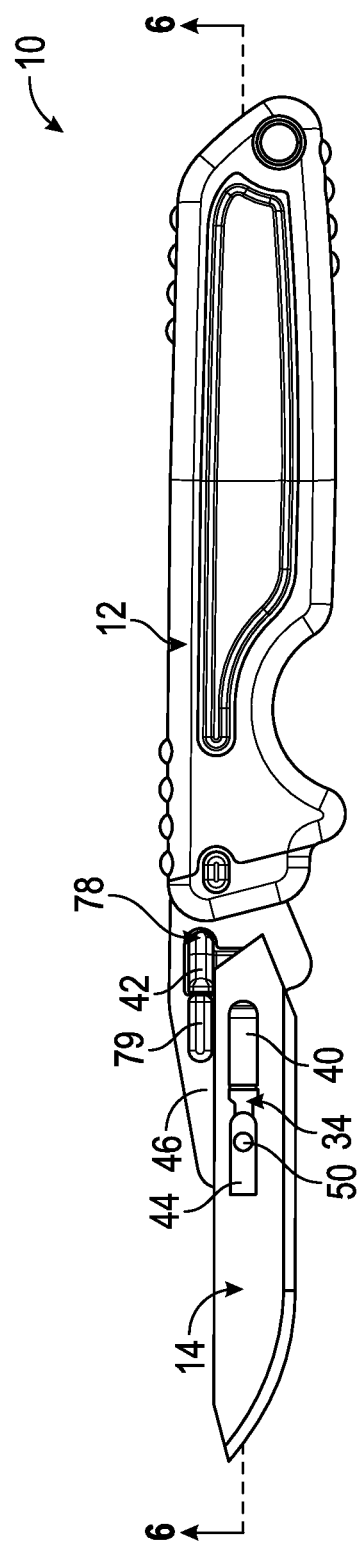
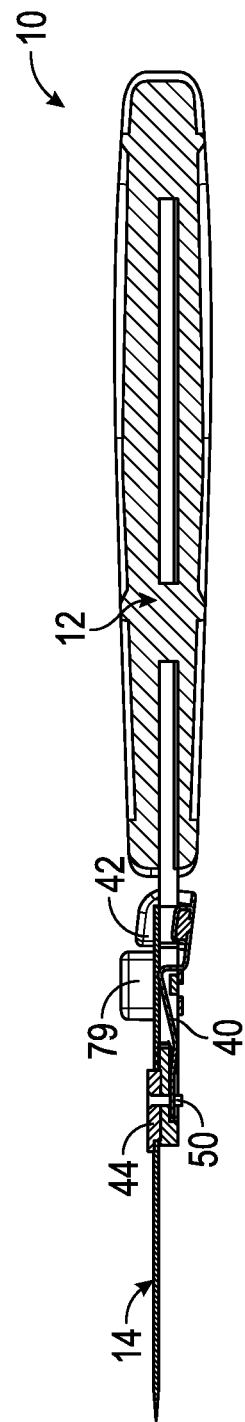

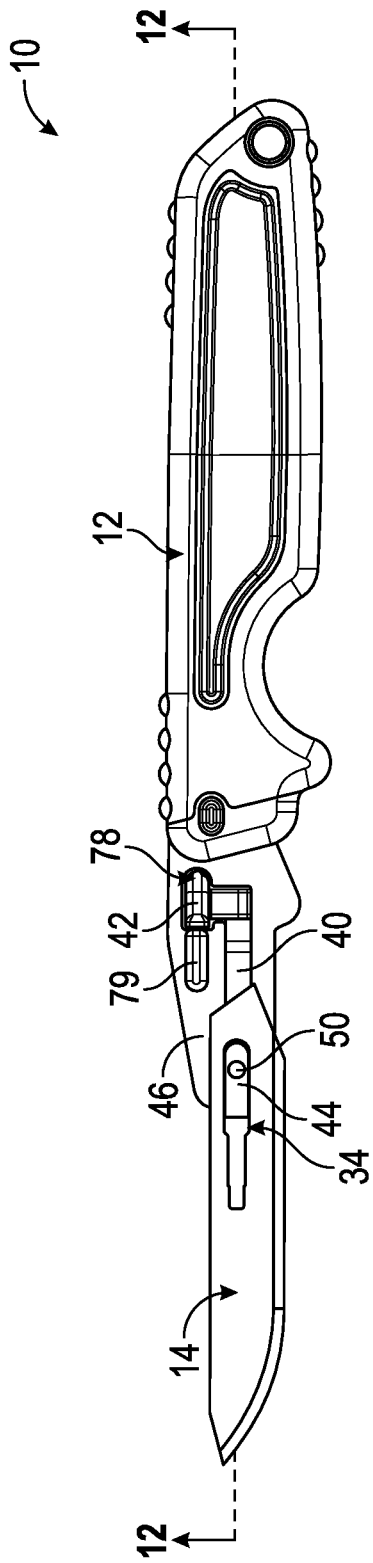
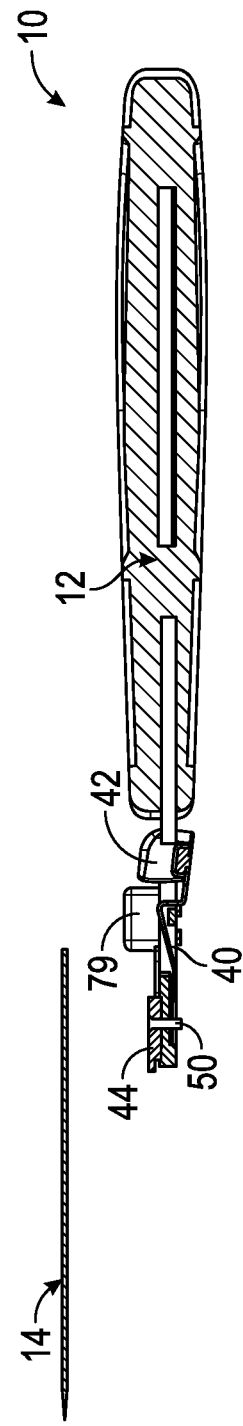
FIG. 11
FIG. 12

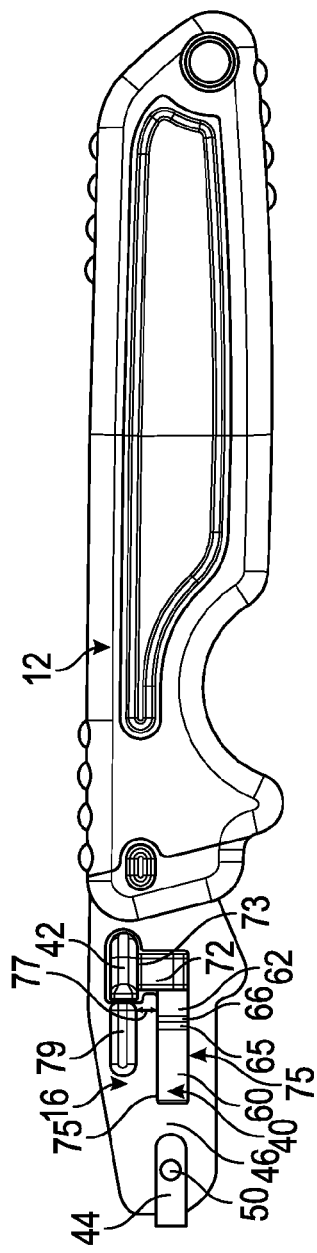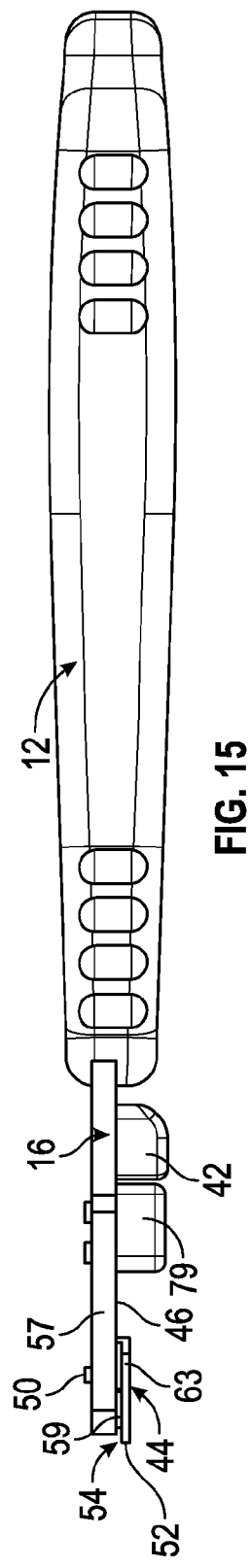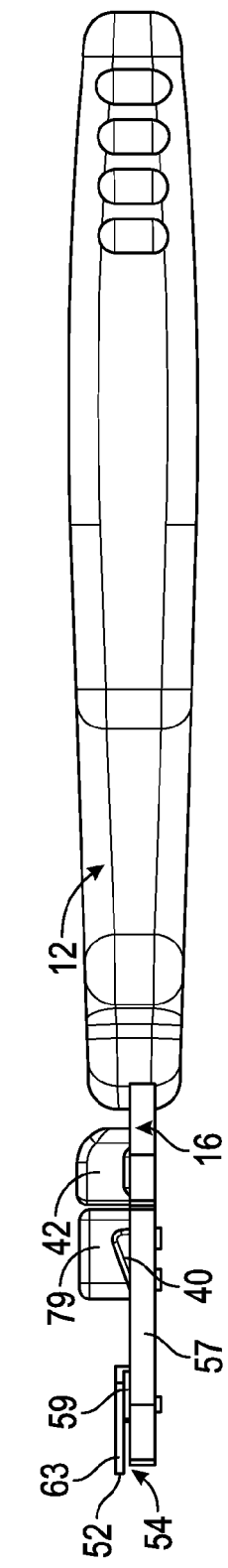

SKINNING KNIFE WITH REMOVABLE BLADE

CROSS-REFERENCE TO RELATED PATENT APPLICATIONS

This application claims the benefit of and priority to U.S. Provisional Application No. 61/834,694, filed Jun. 13, 2013, which is incorporated herein by reference in its entirety.

BACKGROUND

Skinning an animal promptly after a kill is an important and taxing task for a hunter. The fascia that connects the skin to the muscle throughout the carcass is abrasive and wears down the blade edge quickly and makes the job of skinning tedious and tiring. A replaceable blade knife ensures that a hunter's energy is spent on skinning and not sharpening the blade of his knife.

SUMMARY

One embodiment of the invention relates to a skinning knife including a handle, a blade carrier coupled to the handle, the blade carrier including a mount having a mounting surface, a boss extending outward from the mounting surface, and a spring including a front portion, a middle portion, and a rear portion, the front portion secured to the mount proximate a front end of the spring, the middle portion bent outward from the front portion and the rear portion, and the rear portion including a free end of the spring movable relative to the mount, a button coupled to the rear portion of the spring and configured for actuation by a user to move the rear end of the spring, and a blade including a sharpened edge, a body, and a slot formed through the body, the slot extends in a longitudinal direction from a front end to a rear end and includes a narrow portion of a first width and a wide portion of a second width greater than the first width, the narrow portion includes the front end of the slot and the wide portion includes the rear end of the slot. In a first mode of operation, the blade is secured to the blade carrier with the boss positioned in the narrow portion of the slot and the engaging the front end of the slot and the middle portion of the spring positioned in the wide portion of the slot and engaging the rear end of the slot. In a second mode of operation, the blade is removed from the blade carrier by depressing the button so that the middle portion of the spring is moved out of engagement with the rear end of the slot and allowing the boss to be moved out of engagement with the front end of the slot.

Another embodiment of the invention relates to a skinning knife including a handle, a blade carrier coupled to the handle, the blade carrier including a mount having a mounting surface, a boss extending outward from the mounting surface, and a spring including a front portion, a middle portion, and a rear portion, the front portion secured to the mount proximate a front end of the spring, the middle portion bent outward from the front portion and the rear portion, and the rear portion including a free end of the spring movable relative to the mount, and a blade including a sharpened edge, a body, and a slot formed through the body, the slot extends in a longitudinal direction from a front end to a rear end and includes a narrow portion of a first width and a wide portion of a second width greater than the first width, the narrow portion includes the front end of the slot and the wide portion includes the rear end of the slot. The blade is releasably secured to the blade carrier by interaction between the boss and the spring of the blade carrier and the slot of the blade.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 5 is a front view of the knife of FIG. 4.
FIG. 6 is a section view of the knife of FIG. 5 along line 6-6.
FIG. 11 is a front view of the knife of FIG. 10.
FIG. 12 is a section view of the knife of FIG. 11 along line 11-11.
FIG. 14 is a front view of the knife body of FIG. 13.
FIG. 15 is a top view of the knife body of FIG. 13.
FIG. 16 is a bottom view of the knife body of FIG. 13.

DETAILED DESCRIPTION

Referring to FIGS. 1-27, a tool, shown as a knife 10, is shown according to an exemplary embodiment. The knife 10 includes a handle 12 having a first end coupled to a replaceable implement, shown as, but not limited to, a blade 14. The blade 14 is coupled to the handle 12 by a blade carrier 16. The handle 12 and the blade carrier 16 form the knife body.

Figure 1:
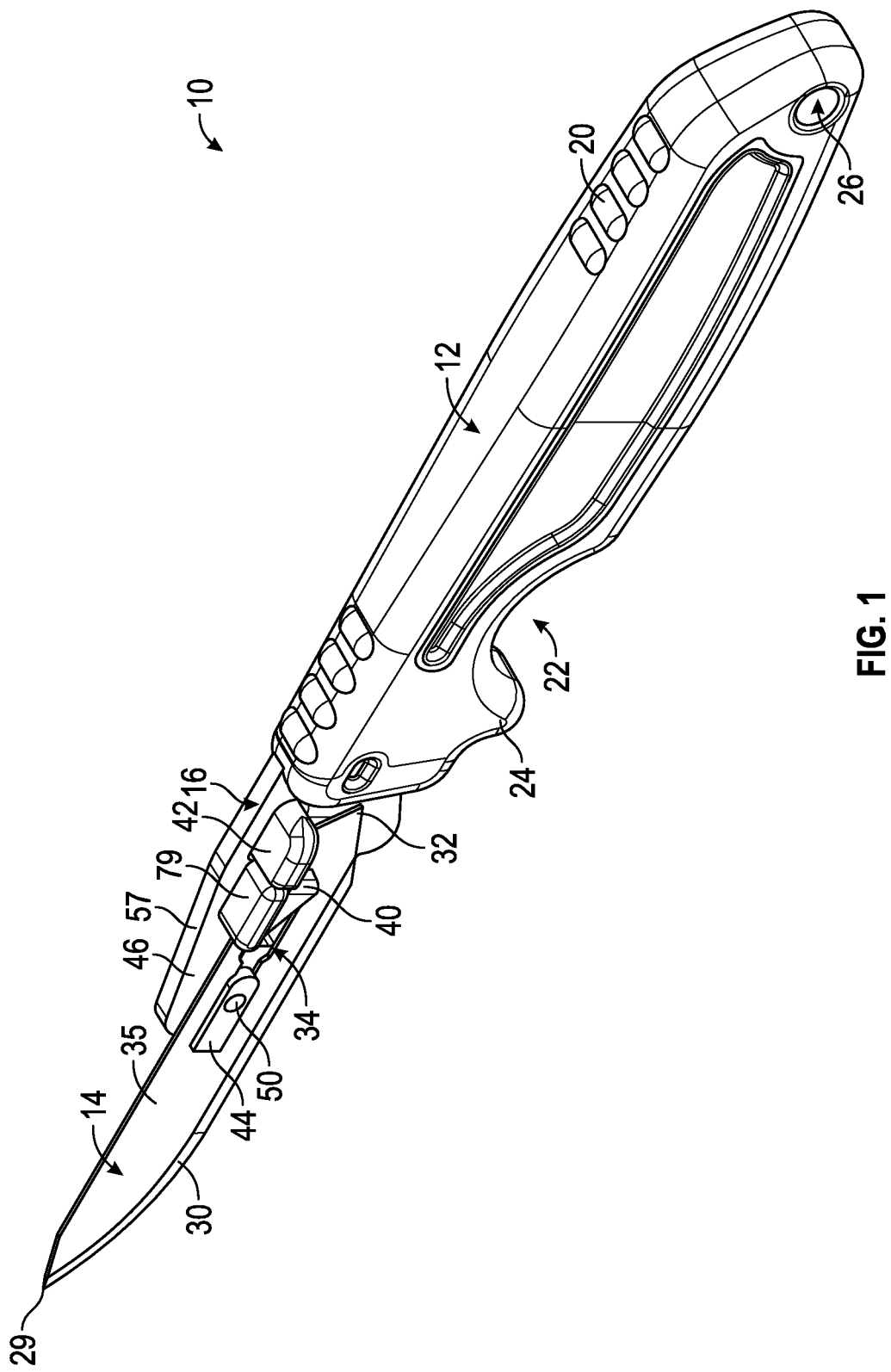
FIG. 1 is a perspective view of a knife with a replaceable blade, according to an exemplary embodiment.

As shown in FIG. 1, according to an exemplary embodiment, the handle 12 of the knife 10 is an elongated, contoured body that is configured to be grasped by the user of the knife 10. The handle 12 includes surface features, shown as ridges 20 (e.g., protrusions, raised portions, etc.) to facilitate a user's grip on the handle 12. The handle 12 may be shaped to include a contour or hollow 22 for a user's finger and a guard 24 forward of the hollow 22. According to the exemplary embodiment shown in the FIGS. 1-4, the handle 12 also includes an opening shown as a lanyard opening 26 located adjacent a second end of the handle 12. According to an exemplary embodiment, the handle may be molded as a single body (e.g., injection molded from a polymer such as nylon or polypropylene). According to another exemplary embodiment, the handle may include a pair of handle sides that are coupled together with fasteners (e.g., screws).

Figure 18:
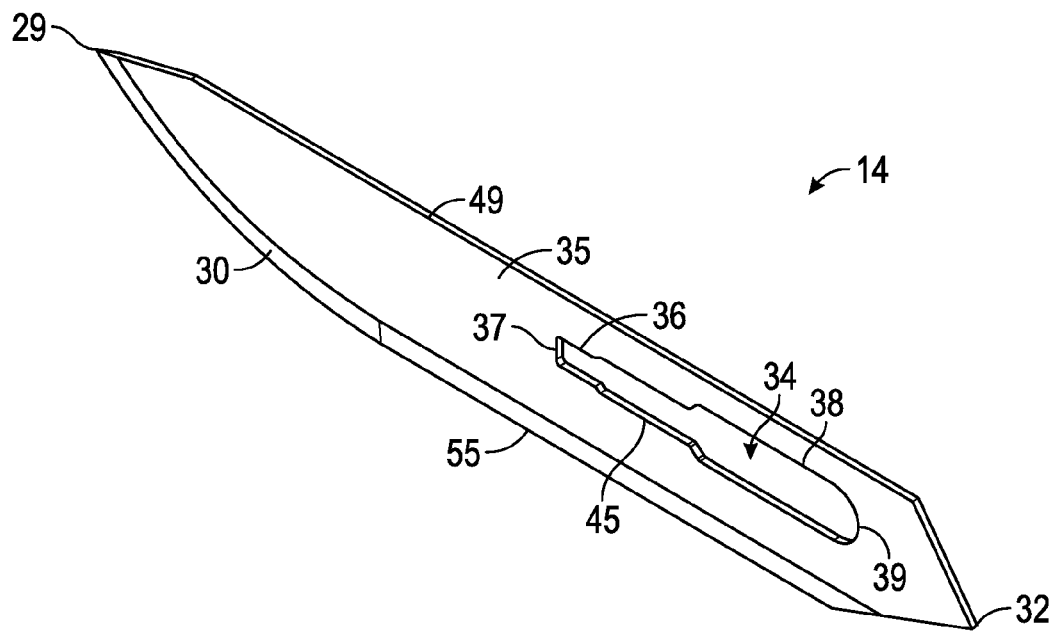
FIG. 18 is a perspective view of the blade of FIG. 1.
Figure 19:
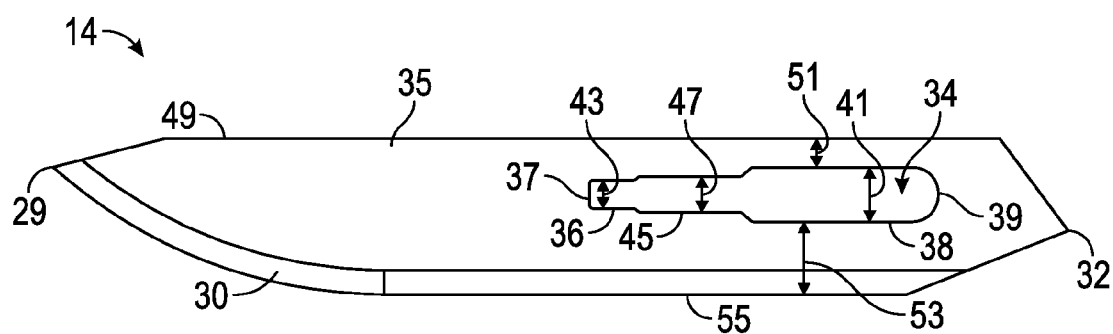
FIG. 19 is a front view of the blade of FIG. 18.
Figure 20:
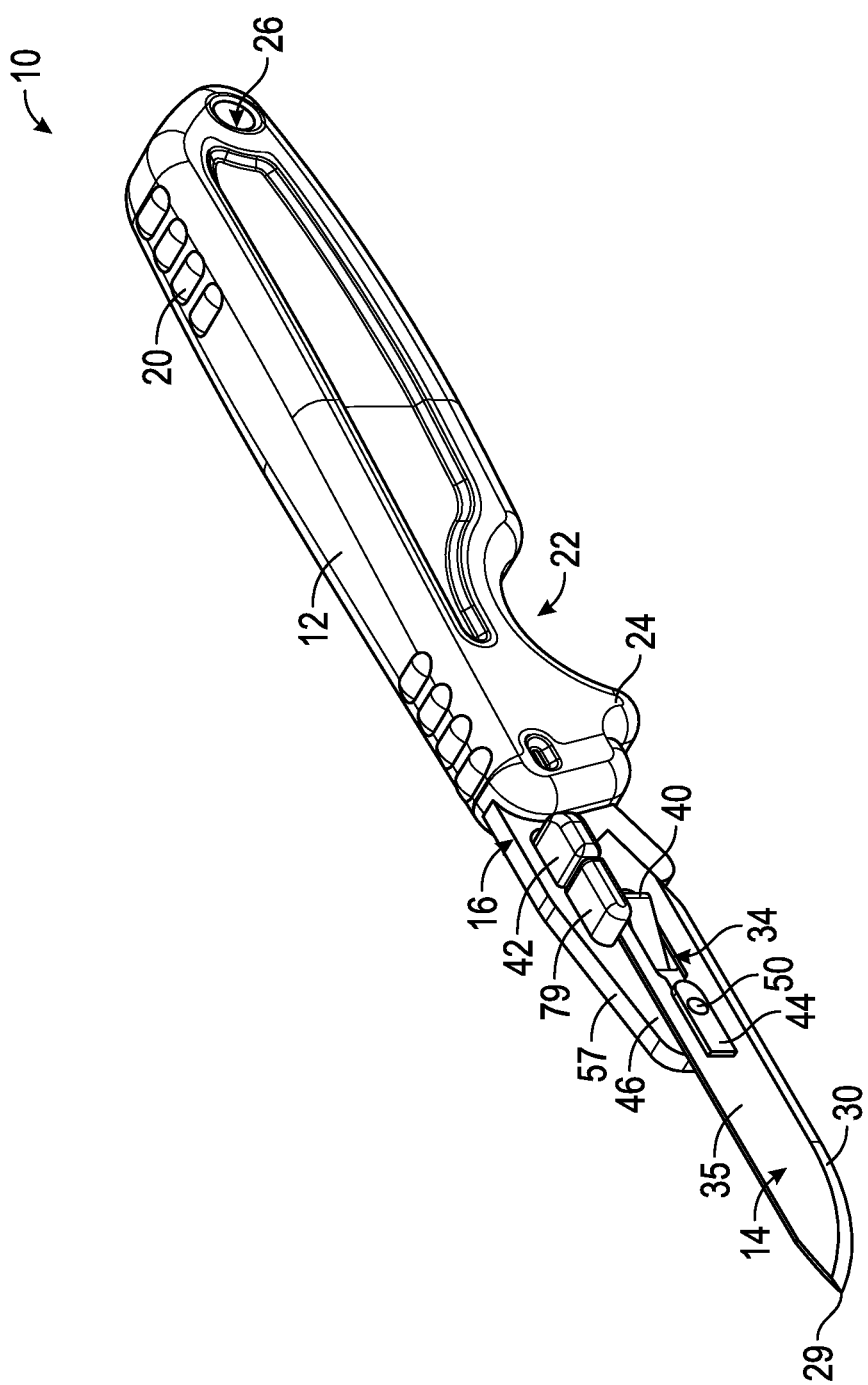
FIG. 20 is a perspective view of the knife of FIG. 1.
Figure 21:
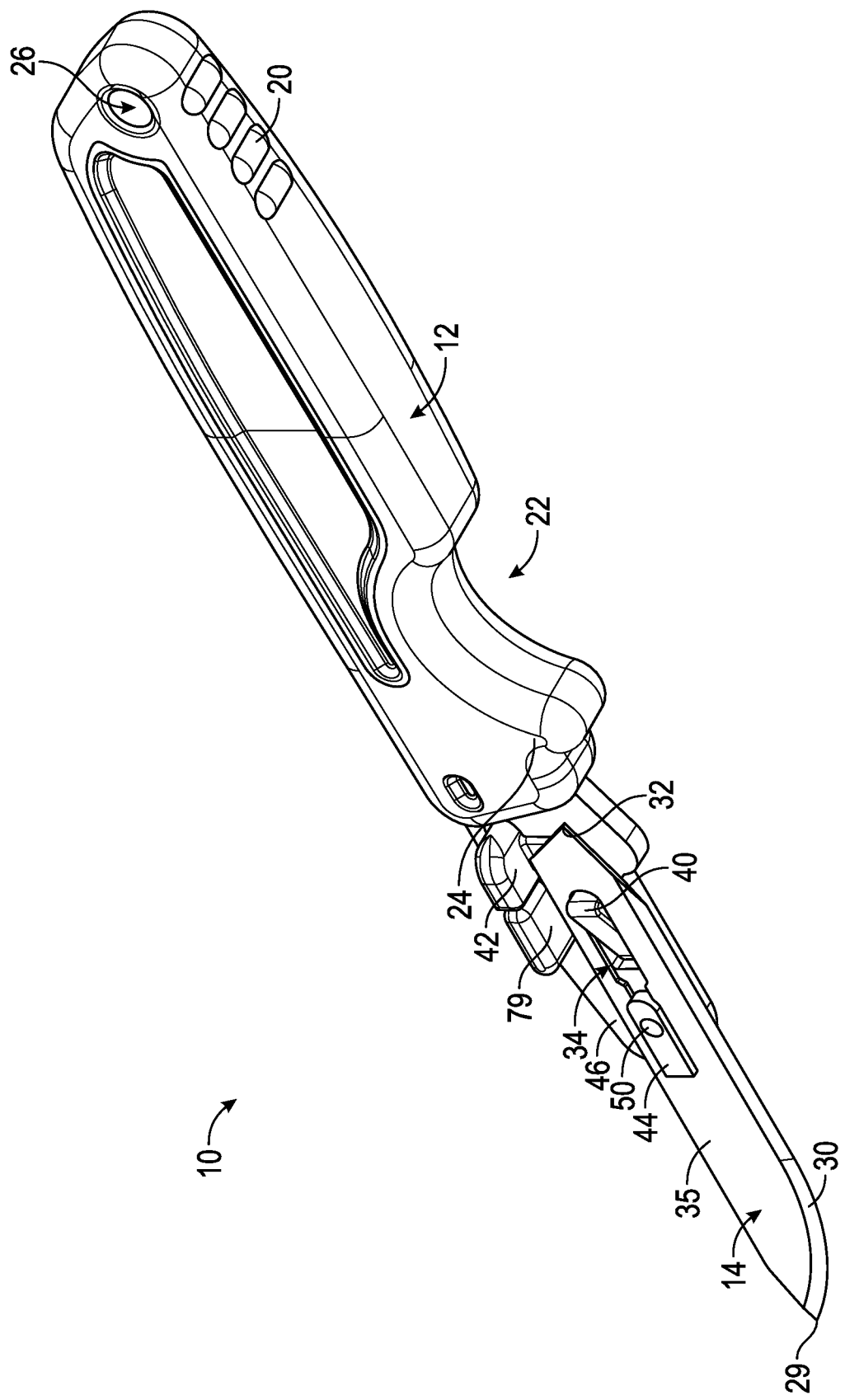
FIG. 21 is a perspective view of the knife of FIG. 1.
Figure 22:
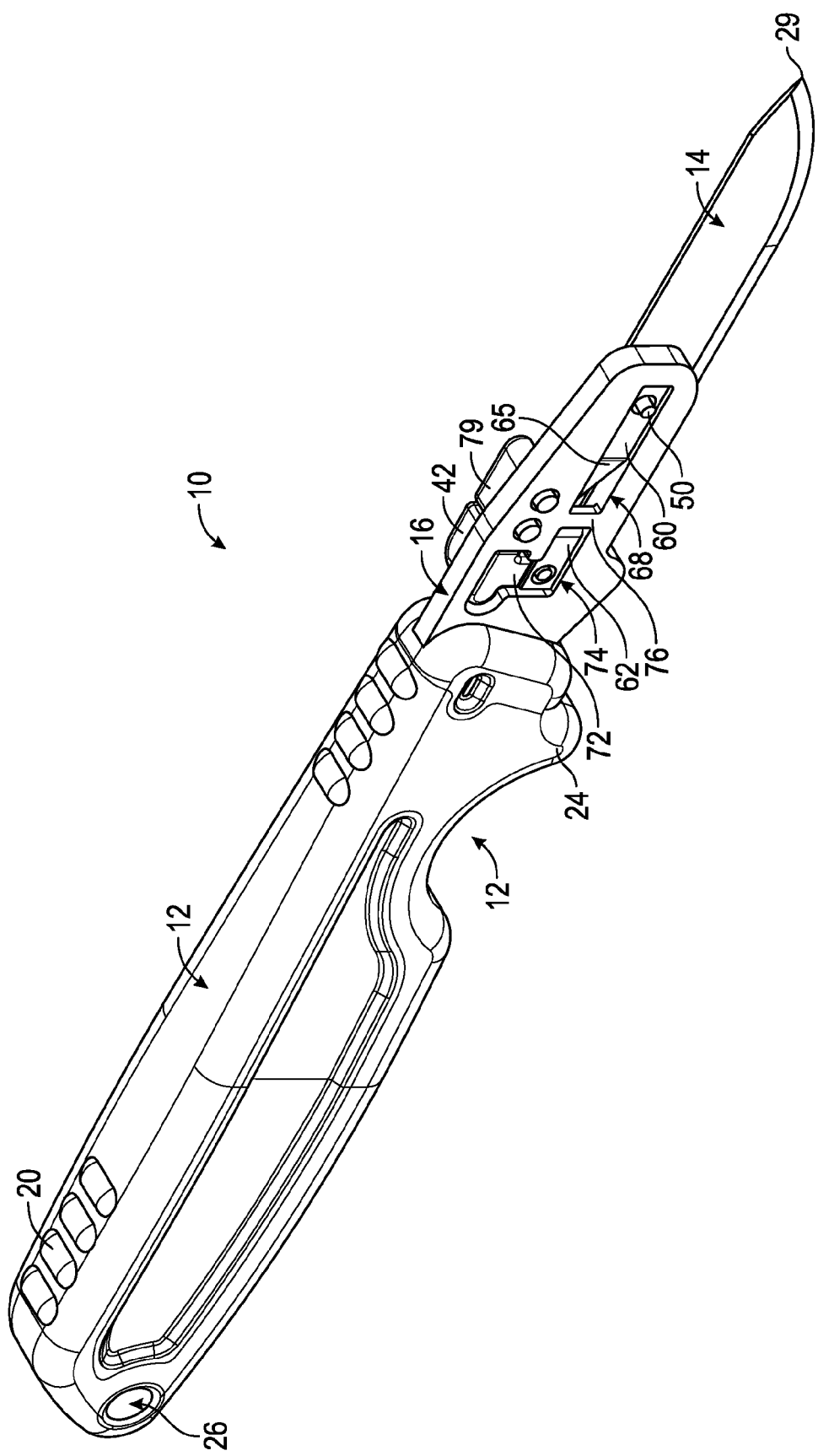
FIG. 22 is a perspective view of the knife of FIG. 1.
Figure 23:
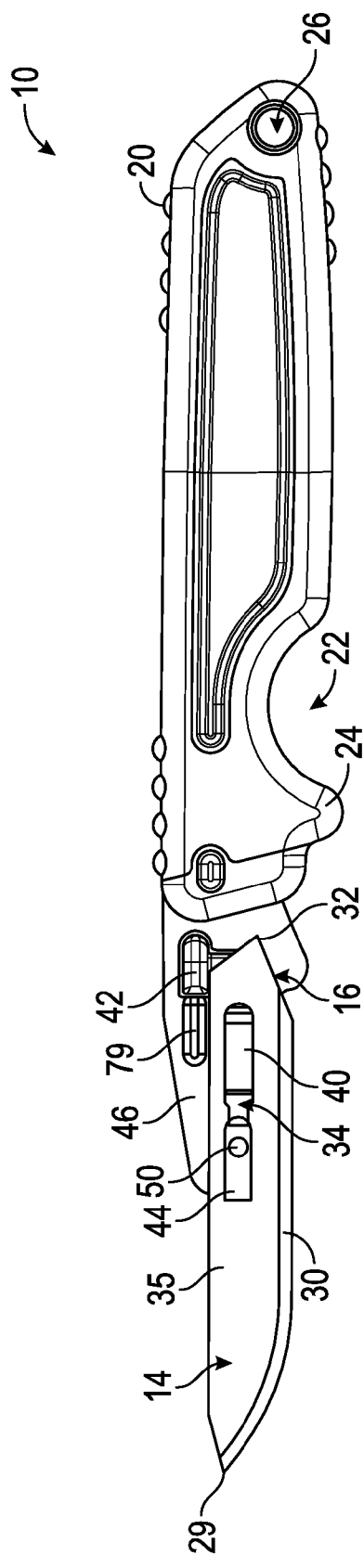
FIG. 23 is a front view of the knife of FIG. 1.
Figure 24:
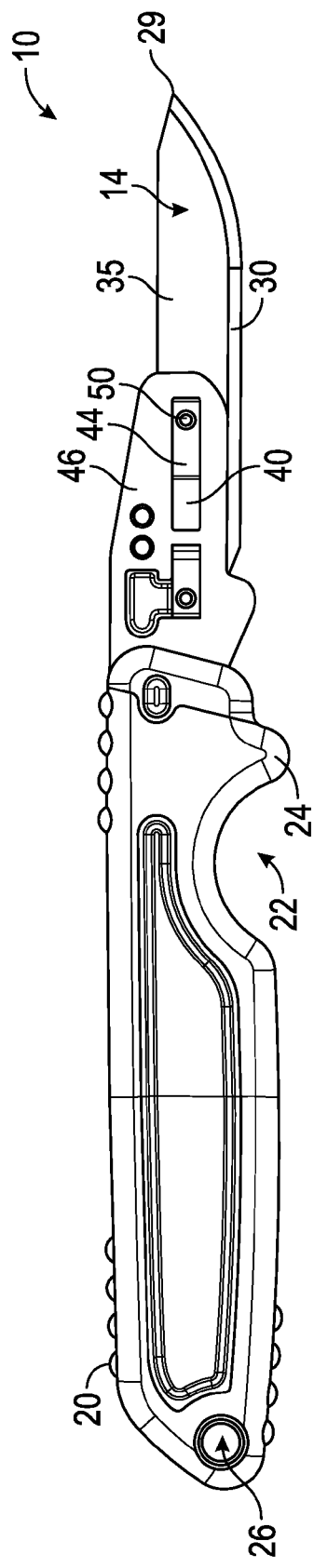
FIG. 24 is a rear view of the knife of FIG. 1.
Figure 25:
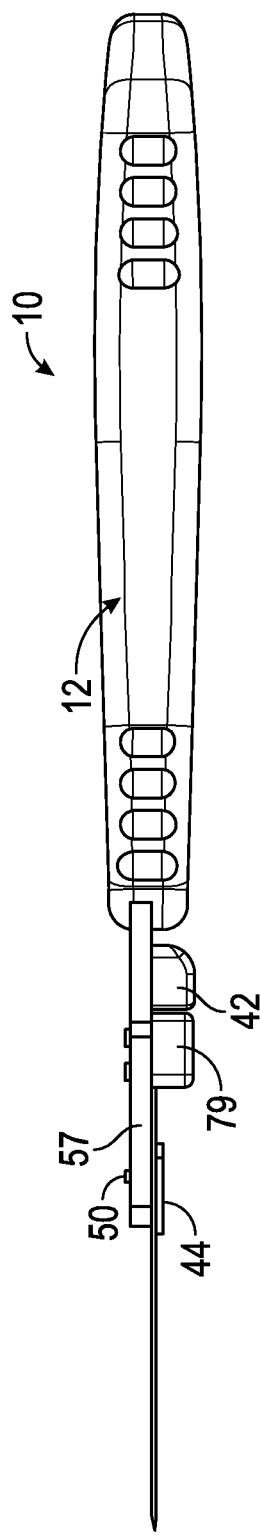
FIG. 25 is a top view of the knife of FIG. 1.
Figure 26:
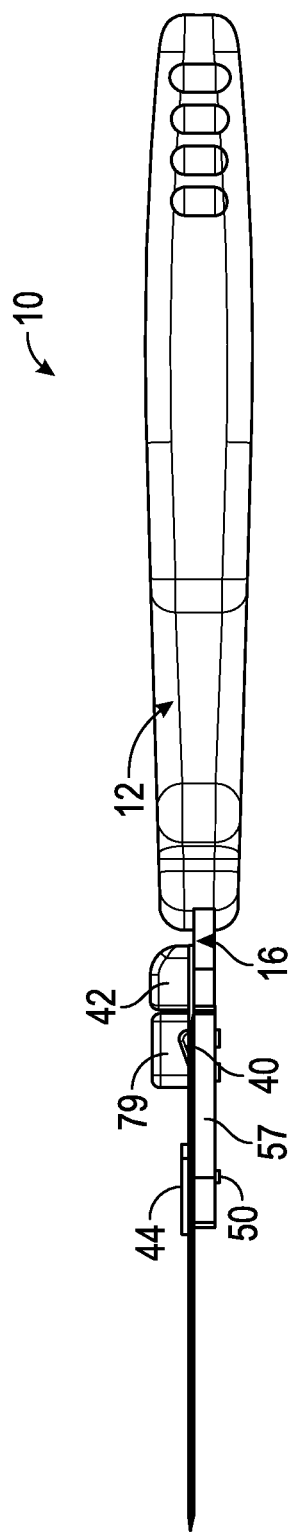
FIG. 26 is a bottom view of the knife of FIG. 1.
Figure 27:
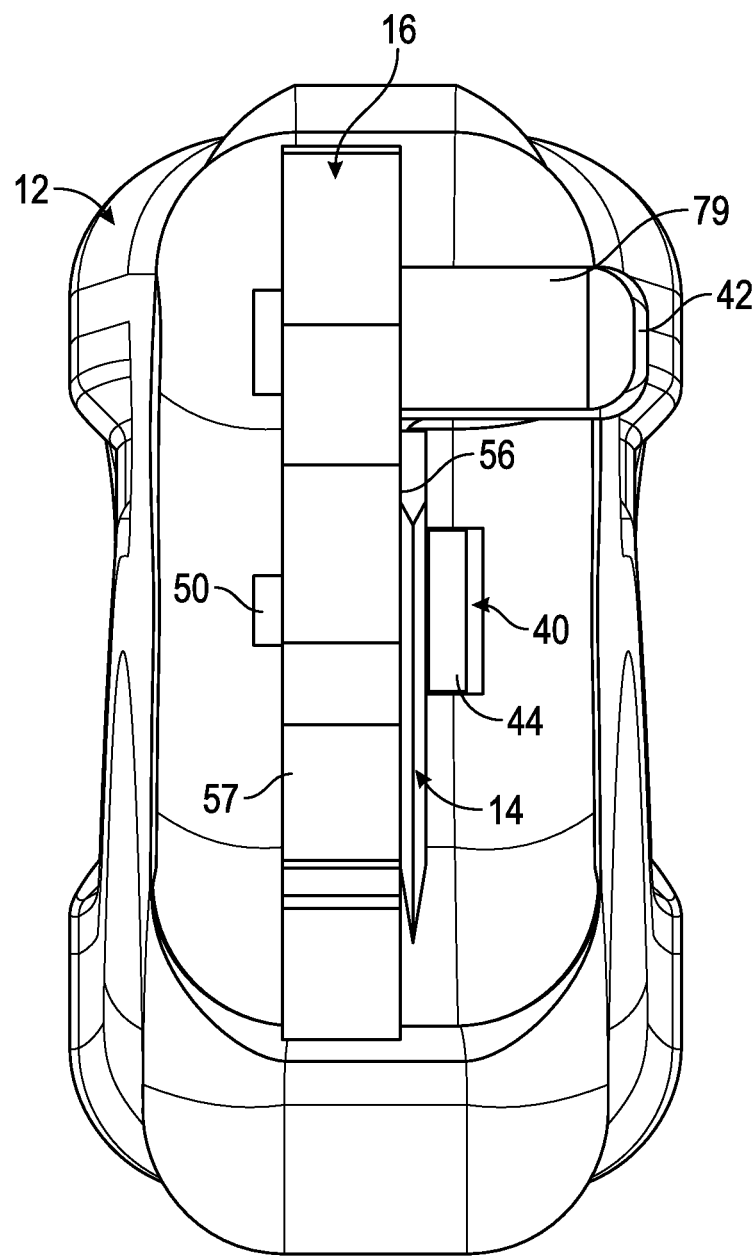
FIG. 27 is a left-side view of the knife of FIG. 1.

Referring to FIGS. 18-19, according to an exemplary embodiment, the blade 14 is a standard, replaceable blade, shown as a size 60 scalpel blade. In other embodiments, other blades of different sizes and/or non-standard blades are used. The blade 14 includes a first end or portion 29, a sharpened edge 30, and a second end or portion 32. The blade 14 further includes a slot 34 extending through a body 35 of the blade 14. The slot 34 extends longitudinally along the blade 14. The slot 34 is a standardized opening that is configured to allow the blade 14 to be coupled to a wide variety of holders and includes a first, narrow portion 36 proximate the front end 37 of the slot and a second, wide portion 38 proximate the rear end 39 of the slot. As illustrated, the front end 37 is flat and the rear end 39 is rounded, though other shapes are possible. The wide portion 38 is an oblong opening with a width 41 that is greater than the width 43 of the narrow portion 36. As illustrated, an intermediate portion 45 of the slot is located between the narrow portion 36 and the wide portion 38 and has a width 47 greater than the width 43 of the narrow portion and less than the width 41 of the wide portion 38. The slot 34 is offset towards the top edge 49 of the blade 14 (e.g., the side opposite the sharpened edge 30). The top of the slot 34 is spaced apart from the top edge 49 of the blade by a distance 51 less than a distance 53 between the bottom of the slot 34 and a bottom portion 55 of the sharpened edge 30.

The blade 14 is coupled to the blade carrier 16. According to one exemplary embodiment, shown in FIGS. 1-27, the carrier 16 is rigidly coupled to the handle 12 (i.e., fixedly coupled so that the carrier 16 does not pivot relative to the handle 12). For example, the handle 12 may be overmolded onto the carrier 16 or the carrier 16 may be received in an opening in the handle 12 or between separate portions of the handle 12 and coupled to the handle 12 with one or more fasteners (e.g., rivets, screws, etc.) or another coupling mechanism, such as with adhesives, heat staking, welding, etc. The carrier 16 includes a mount 57, a spring 40, a user interface, shown as a button 42 coupled to the spring 40, and a boss 44 extending outward from a first or mounting surface 46 of the carrier 16.

Figure 17:
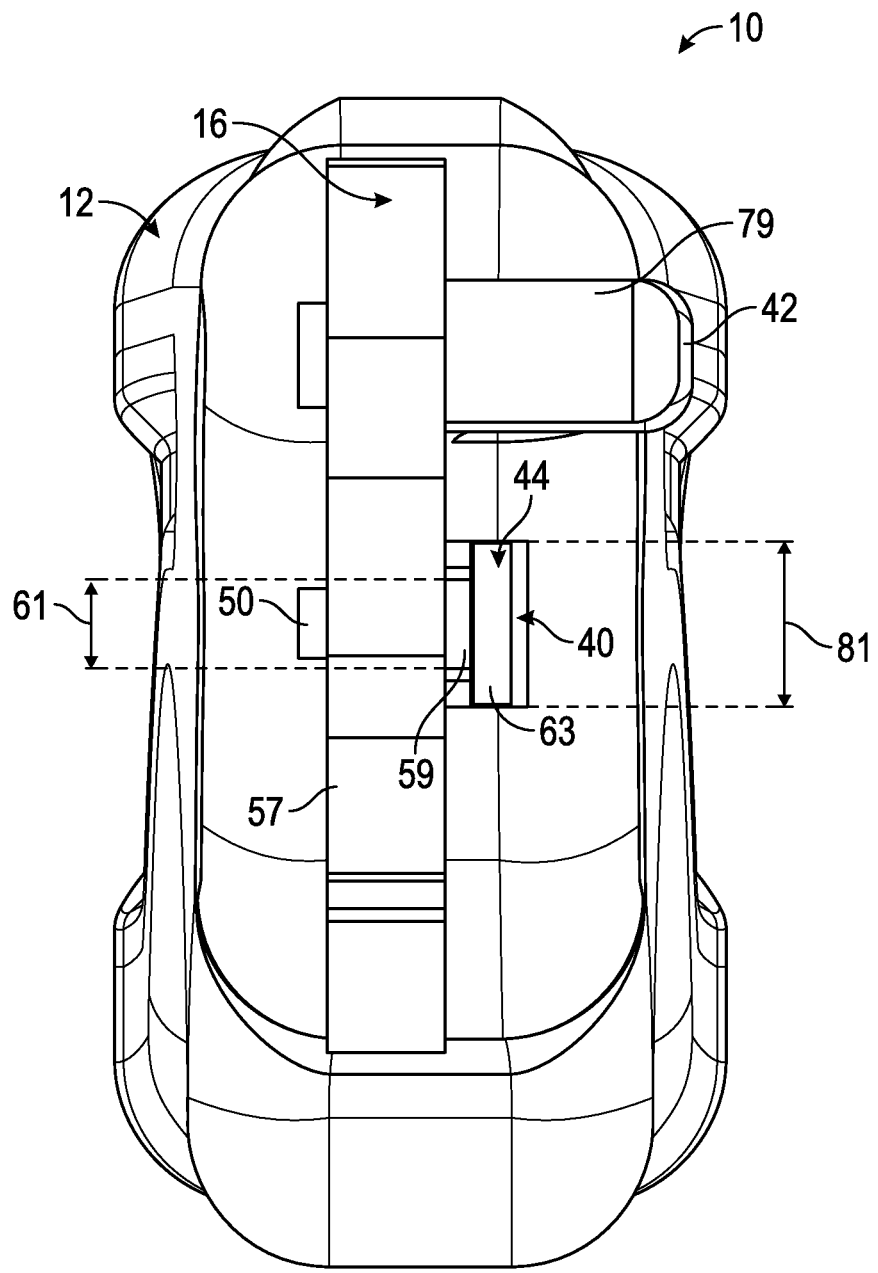
FIG. 17 is a left-side view of the knife body of FIG. 13.

As shown in FIGS. 15-17, the boss 44 is shaped to be received in the slot 34. The boss 44 includes a narrow portion 59 having a width 61 and a wide portion 63 having a width 81 greater than the width 61 and greater than the width 43 of the narrow portion 36 of the slot 34. The narrow portion 59 is positioned between the mounting surface 46 and the wide portion 63. The boss 44 includes an overhang 52 including the front end of the boss 44, which is separated from the mounting surface 46 by a gap 54. The gap 54 is approximately as wide as the thickness of the blade 14 so that a portion of the body 35 of the blade 14 can be positioned within the gap 54 when the blade 14 is secured to the carrier 16. According to one exemplary embodiment, the boss 44 may be a separate body coupled to the carrier 16 with an appropriate coupling member, such as a rivet 50. According to another exemplary embodiment, the boss 44 may be coupled to the carrier with another mechanical fastener, such as a screw or with an adhesive applied between the boss 44 and the mounting surface 46. According to another exemplary embodiment, the boss 44 may be integrally formed with the mount 57 of the carrier 16.

Figure 3:
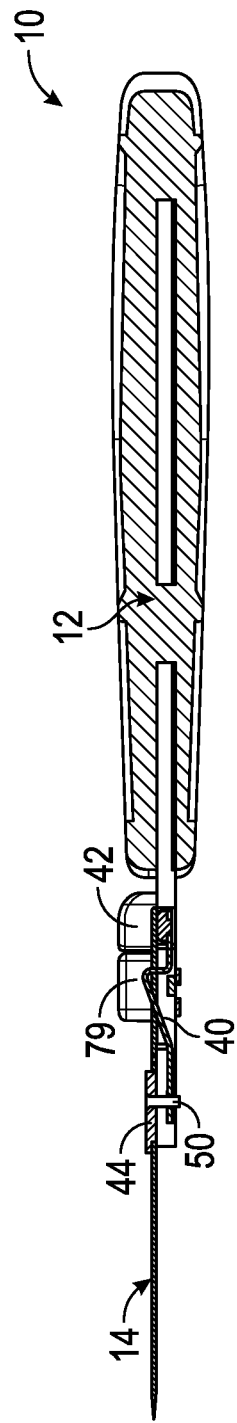
FIG. 3 is a section view of the knife of FIG. 2 along line 3-3.
Figure 3A:
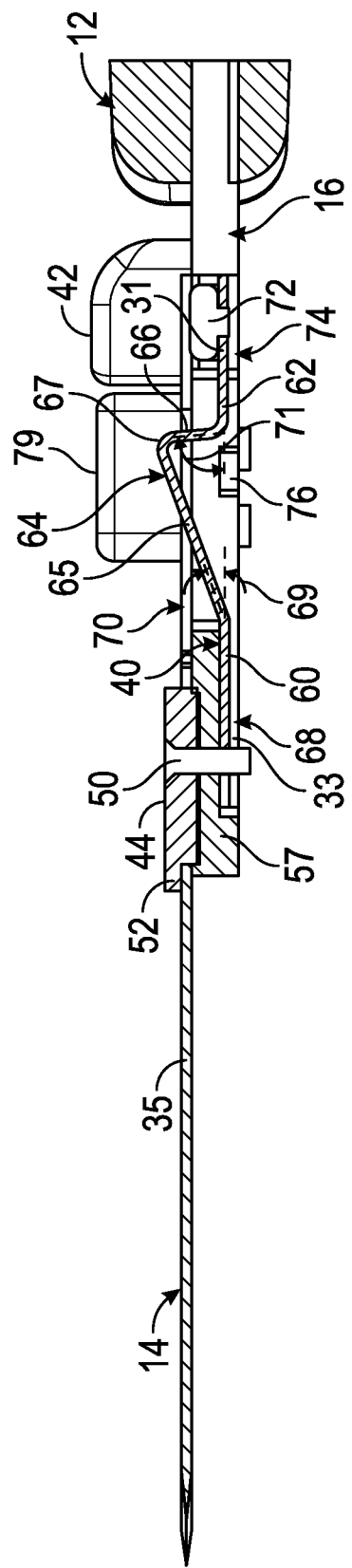
FIG. 3A is a detail view of a portion of FIG. 3.
Figure 4:
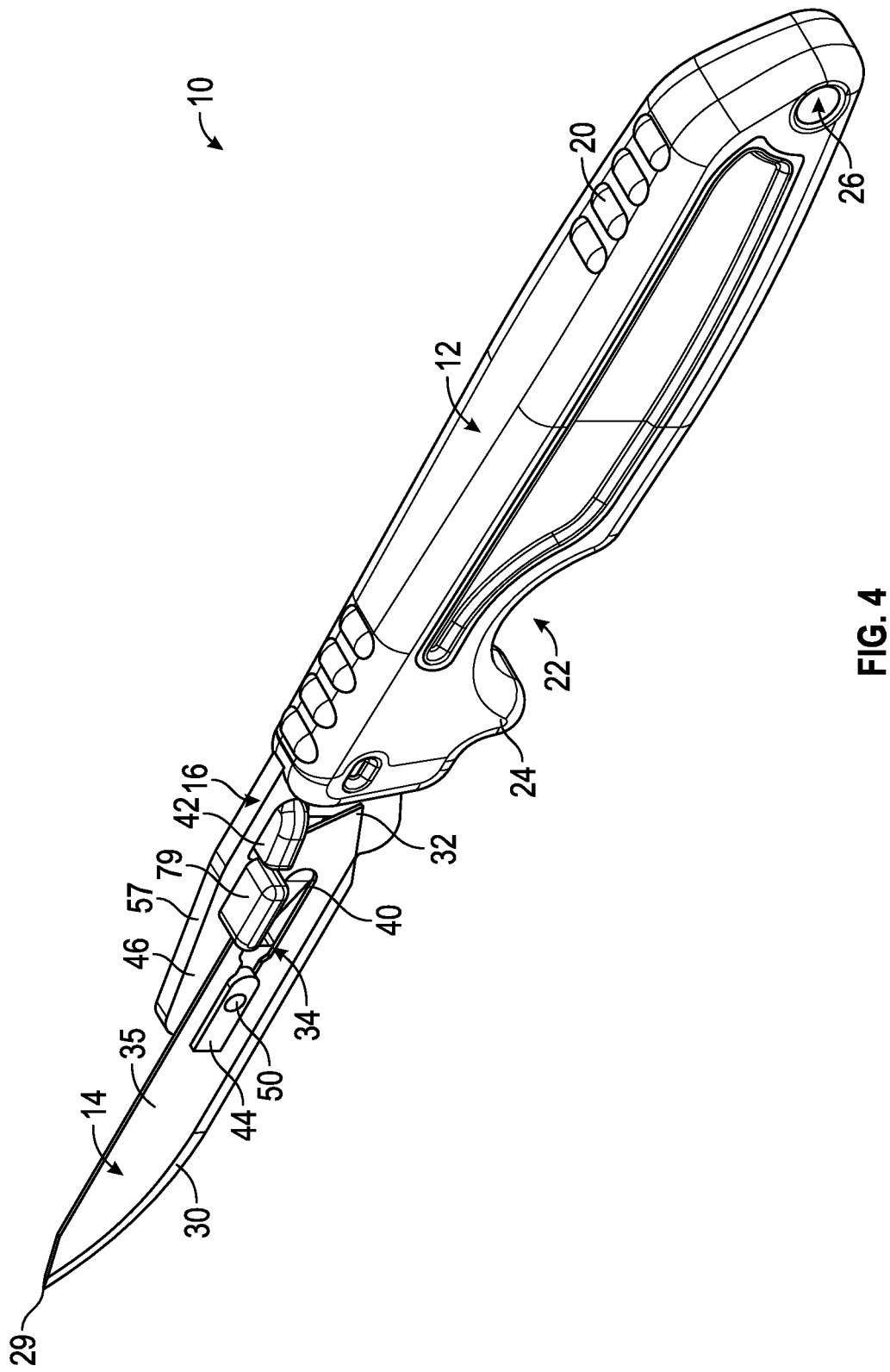
FIG. 4 is a perspective view of the knife of FIG. 1.

The spring 40 (e.g., cantilever spring, leaf spring, cam spring, spring arm, etc.) is configured to selectively engage the blade 14 to couple the blade 14 to the carrier 16 when in an extended position or disengage from the blade 14 in a retracted position to allow the blade 14 to be removed from the carrier 16. Referring to FIG. 3A, the spring 40 is shown to have a first or front portion 60 coupled to the mount 57 of the carrier 16, a second or rear portion 62 coupled to the button 42 and free to move relative to the mount 57, and a middle portion 64 extending between the front portion 60 and the rear portion 62. The middle portion 64 is bent outward from the front portion 60 and the rear portion 62. The middle portion 64 includes a first leg 65 and a second leg 66 that meet at a vertex 67. The middle portion 64 is dimensioned to be received by the wide portion 38 of the slot 34 of the blade 14.

According to an exemplary embodiment, the spring 40 is coupled to the mount 57 at the front portion 60 proximate the front end 33 of the spring 40. The front portion 60 is positioned within a cutout or slot 68 (e.g., aperture, opening, pocket, compartment, slit, cut, hollow, recess, etc.) located in mount 57. According to an exemplary embodiment, the front portion 60 is coupled to the mount 57 with the same rivet 50 that couples the boss 44 to the mount 57. The first leg 65 of the middle portion 64 is inclined at an angle 69 to the front portion 60 such that the middle portion 64 extends through an aperture or opening 70 in the mount 57 to protrude outward from the mounting surface 46. The second leg 66 is inclined at an angle 71 to the rear portion 62. According to an exemplary embodiment, the angle 71 is greater than the angle 69. The rear portion 62 of the spring 40 is attached to the button 42, such as to an arm 72 extending laterally from the button 42. The rear portion 62 of the spring 40 includes a free end 31. The rear portion 62 of the spring 40 and the arm 72 are received in an aperture or opening 74 (e.g., aperture, opening, pocket, compartment, slit, cut, hollow, recess, etc.) located in the mount 57. The button 42 extends through an opening 78 in the mount 57 (see FIG. 3) such that the button 42 extends outward from the mounting surface 46 of the carrier 16. The arm 72 spaces the button 42 away from the rear portion 62 of the spring 40 so that the button 42 does not contact the rear portion 32 of the blade 14 when the blade 14 is attached to the carrier 16. This arrangement helps to keep the carrier 16 relatively compact by providing adequate spacing between the moving parts (i.e., the blade 14, the spring 40, and the button 42). The spring 40, the button 42, the arm 72 may be separate components attached to one another or one or more of these components may be integrally formed with one or more of the other components. In some embodiments, the button 42 and/or the arm 72 may be omitted. When a separate button is omitted, the portion of the spring depressed by a user to move the spring may be considered to be the button and this portion of the spring may be considered to be coupled to the rest of the spring.

Figure 2:
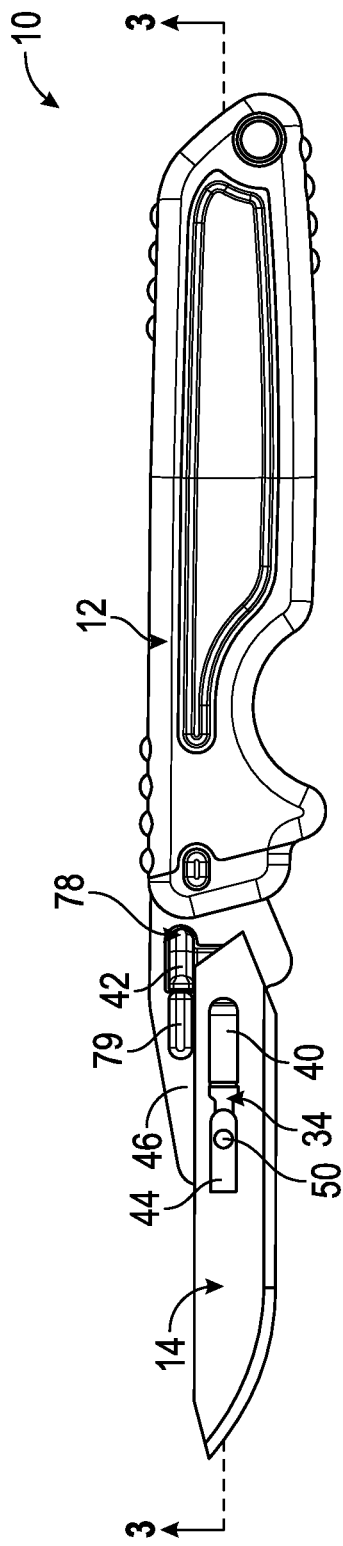
FIG. 2 is a front view of the knife of FIG. 1.

The front portion 60 of the spring 40 has a generally fixed position with respect to the mount 57, while the position of the middle portion 64 and the rear portion 62 of the spring 40 varies depending on the position of the button 42. In other words, the position of rear portion 62 and of the middle portion 64 varies with the amount that the button 42 is depressed by the user. As shown in FIGS. 2-3A in a first position (e.g., rest position, engaged position, use position, etc.), the material properties of the spring 40 bias the spring 40 so that middle portion 64 extends through the spring opening 70, with at least a portion extending beyond the mounting surface 46. As shown in FIGS. 4-9 in the second position (e.g., disengaged position, release position, etc.), the rear portion 62 moves out of the opening 74 as the user pushes the button 42 toward the mounting surface 46. As the button 42 is depressed, the middle portion 64 is moved into the opening 70 and does not extend beyond the mounting surface 46 when the button 42 is fully depressed. This downward travel of the spring 40 is limited by a stop 76 extending across the opening 74. When the user releases the button 42, the spring 40 is biased to return to the first position.

The blade 14 is releasably secured to the blade carrier 16 by interaction between the boss 44 and the spring 40 of the blade carrier 16 and the slot 34 of the blade 14. Actuating the button 42, allows a user to release the blade 14 from the blade carrier 16.

Figure 7:
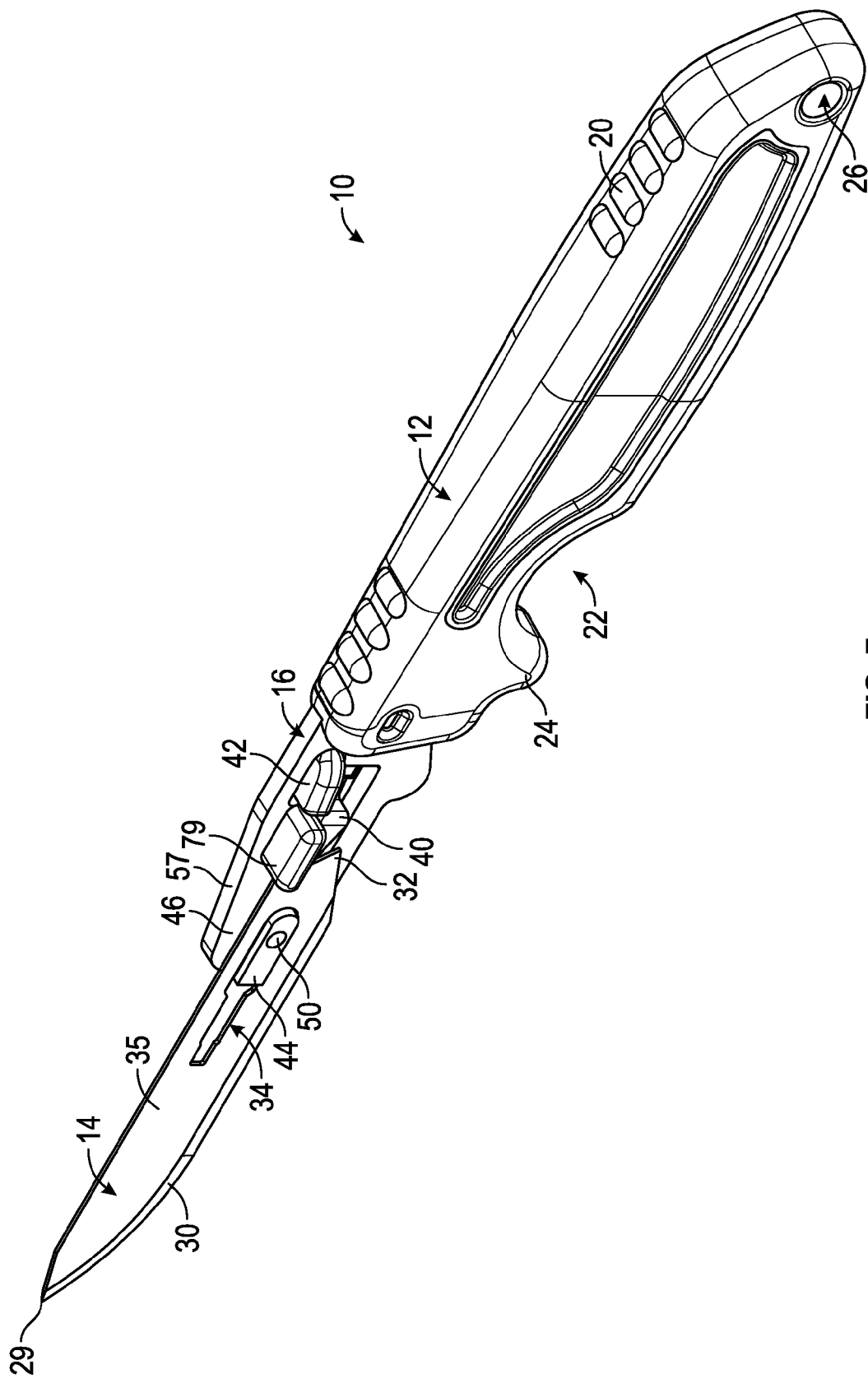
FIG. 7 is a perspective view of the knife of FIG. 1.
Figure 8:
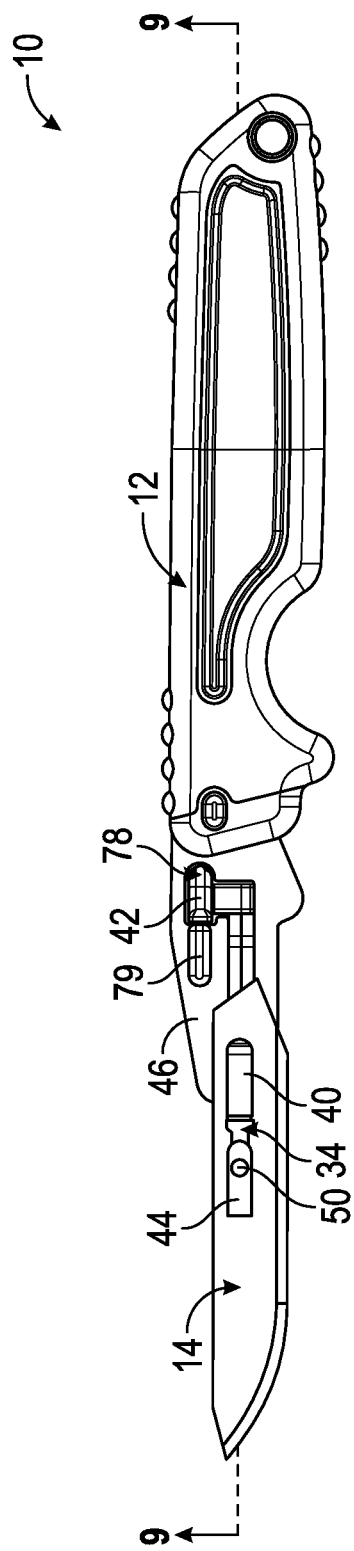
FIG. 8 is a front view of the knife of FIG. 7.
Figure 9:
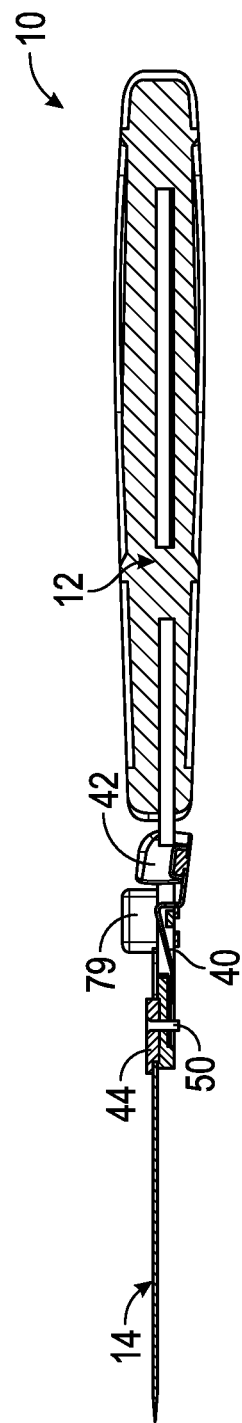
FIG. 9 is a section view of the knife of FIG. 8 along line 9-9.
Figure 10:
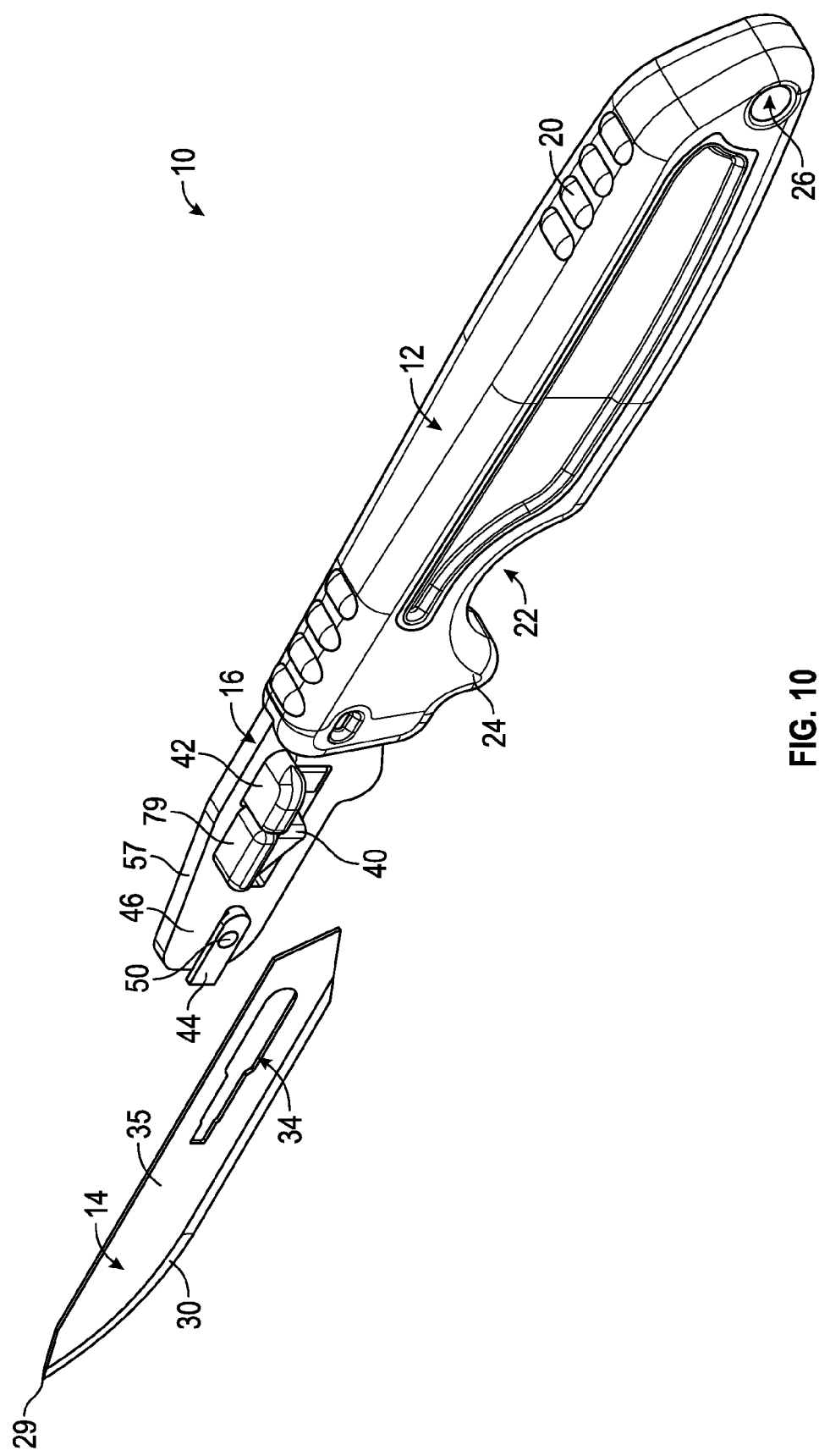
FIG. 10 is a perspective view of the knife of FIG. 1 with the blade removed.
Figure 13:
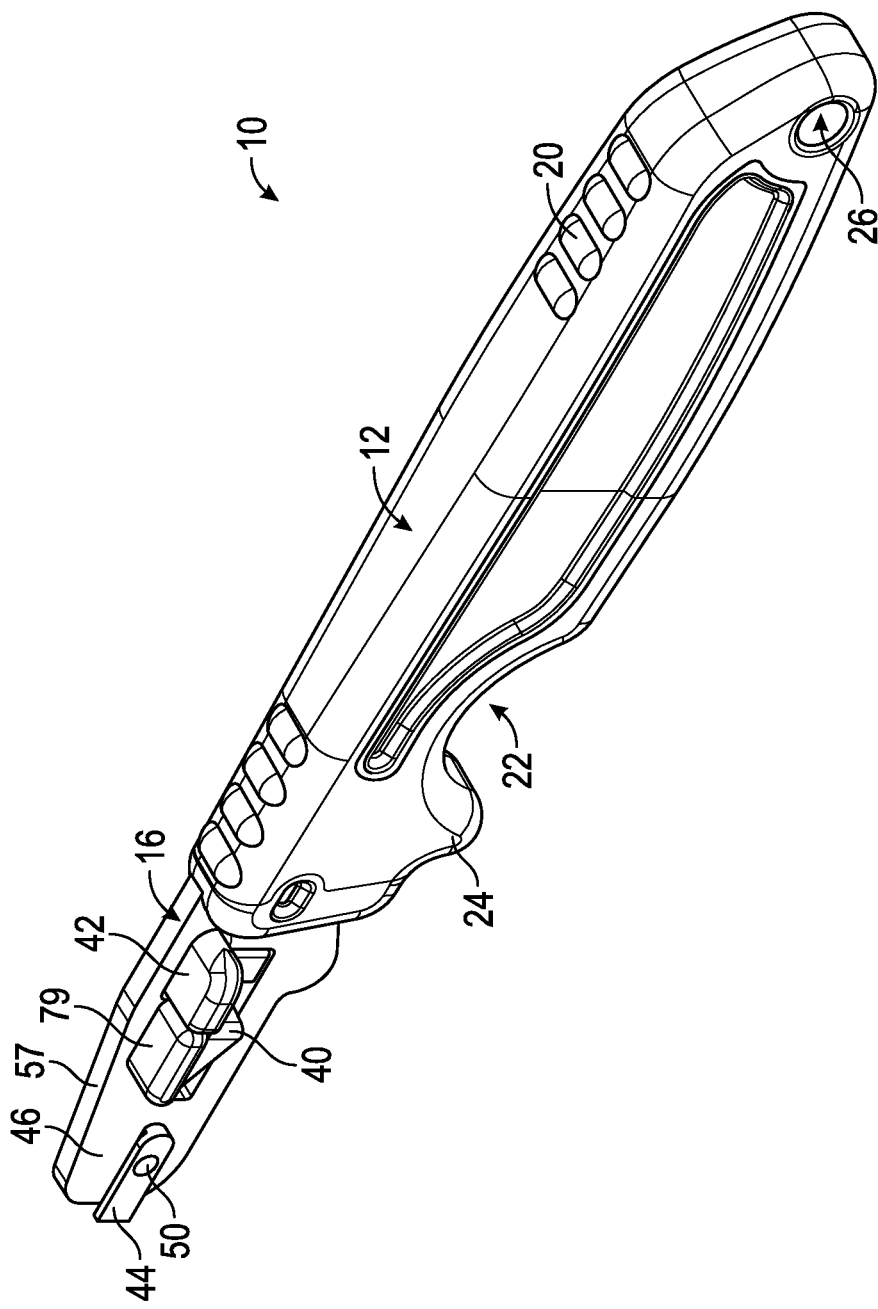
FIG. 13 is a perspective view of the knife body of FIG. 1.

In a first mode of operation, the blade 14 is secured to the carrier 16 by pushing the blade 14 against the mounting surface 46 such that boss 44 is received in the wide portion 38 of the slot 34 (see FIGS. 7-9). The surface of the blade 14 (e.g., the surface of the body 35) pushes the protruding middle portion 64 of the spring 40 down into the spring opening 70. The blade 14 is then moved rearward toward the handle 12, moving the boss 44 into the narrow portion 36 of the slot 34 (see FIGS. 4-6). The blade 14 is fully seated when the front end 37 of the slot 34 engages (i.e., contacts) the boss 44. The front end 37 of the slot 34 is positioned in the gap 54 under the overhang 52 of the boss 44. The contact between the boss 44 and the front end 37 of the slot 34 retains the blade 14 adjacent the mounting surface 46 of the carrier 16. The contact between the boss 44 and the front end 37 of the slot 34 also provides a stop that prevents further movement of the blade 14 toward the handle 12. Also, the narrow portion 59 of the boss 44 is positioned in the narrow portion 36 of the slot 34 so that the wide portion 63 of the boss 44 overlaps a portion of the body 35 of the blade 14 adjacent the narrow portion 36 of the slot 34. This helps to secure the blade 14 to the carrier 16. When the boss 44 is positioned within the narrow portion 36 of the slot 34, the wide portion 38 of the slot 34 is aligned with the spring opening 70, allowing the middle portion 64 of the spring 40 to move into the spring opening 70 such that the second leg 66 protrudes beyond the mounting surface 46 of the carrier 16 (see FIGS. 1-3A). In this position, the second leg 66 contacts the rear end 39 of the slot 34, preventing movement of the blade 14 in away from the handle 12. The position of the blade release button 42 relative to the boss 44 and the offset position of the slot 34 prevents the blade 14 from being installed upside down. The button 42 includes a bottom edge 73 spaced apart from a top edge 75 of the spring 40 by a distance 77. The distance 77 is less than the distance 53 so that the blade 14 can only be secured to the mount 57 with the top edge 49 of the blade 14 adjacent the bottom edge 73 of the button 42. In an exemplary embodiment, the distance 77 is substantially the same as the distance 51. A removable cover or sheath may be provided to protect and cover the blade 14 when not in use.

In a second mode of operation, the blade 14 may be removed from the carrier 16 by reversing the above steps. As the user depresses the button 42, the rear portion 62 of the spring 40 is moved relative to the mount 57 through the interconnection of the rear portion 62 of the spring 40 and the arm 72 (see FIGS. 4-6). The second leg 66 is moved into the spring opening 70 until it no longer contacts the rear end 39 of the slot 34. The blade 14 is therefore free to slide along the mounting surface 46 of the carrier 16 in a direction away from the handle 12 until the boss 44 is moved from the narrow portion 36 into the wide portion 38 of the slot 34 (see FIGS. 7-9). The blade 14 may then be removed from the carrier 16 (see FIGS. 10-12).

Figure 28:
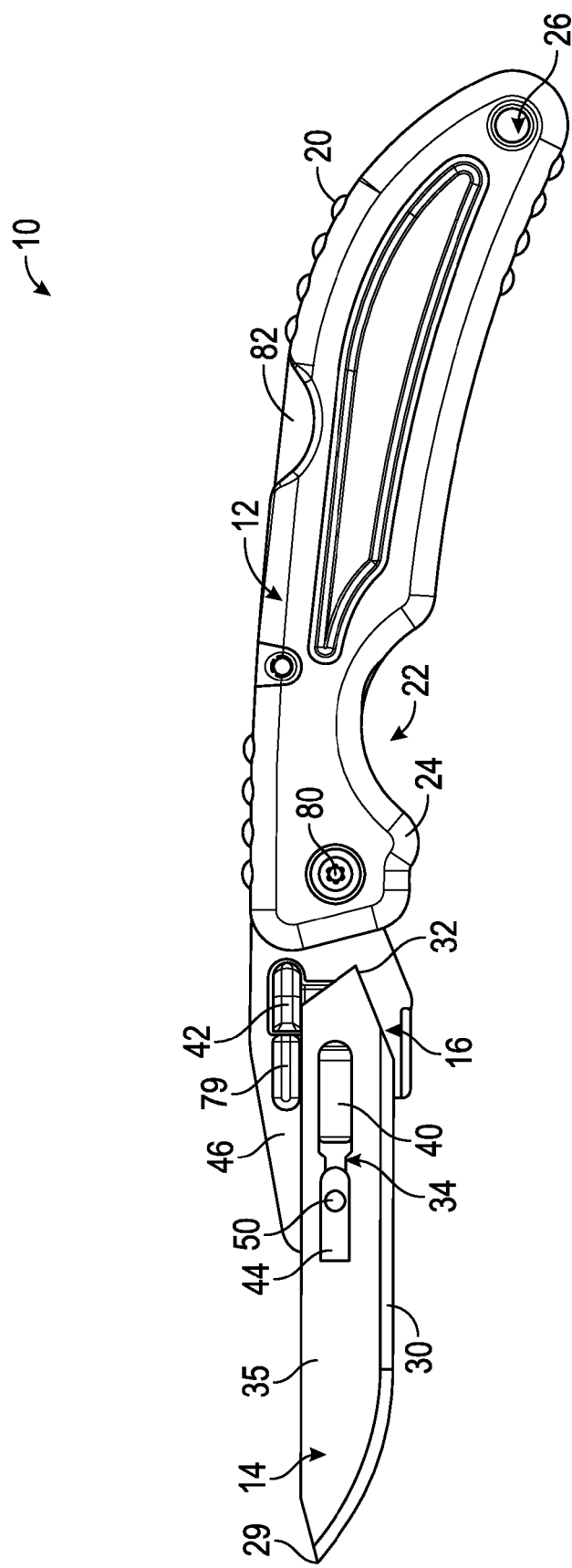
FIG. 28 is a front view of a knife, according to an exemplary embodiment.

Referring now to FIG. 28, in some embodiments, the knife 10 may have a blade carrier 16 that pivots relative to the handle 12, such that the blade carrier 16 and the blade 14 may be folded into the interior of the handle 12 when not in use. With the carrier 16 and the blade 14 folded into the handle 12, the blade 14 is protected and the sharpened edge 30 is concealed within the interior of the handle 12. According to an exemplary embodiment, the carrier 16 is coupled to the handle 12 at a pivot point formed by, for example, a screw that is received by a member such as a barrel with internal threads. The carrier 16 rotates about an axis 80 passing through the screw and barrel or other member coupling the carrier 16 to the handle 12. A thumb stud 79 is coupled to the carrier 16 to provide an interface for the user to move the carrier 16 between extended and folded positions. According to an exemplary embodiment, the knife 10 may include a locking mechanism 82 that retains the carrier 16 in the extended position or the folded position. A user may actuate the locking mechanism 82 (e.g., press down on the locking mechanism 82) to release the carrier 16 and allow the carrier 16 to rotate freely about the axis 80.

The components depicted in the figures are constructed of materials known in the knife arts. The handle may be constructed from a metallic material (such as a titanium or titanium alloy) or a polymer material (e.g. polypropylene, nylon, etc.). The spring (such as spring 40) may be constructed from a stainless steel alloy and also may have a spring temper to maintain the proper biasing forces discussed above. Additionally, according to one exemplary embodiment, the spring is of a configuration and material chosen to match the desired resistance for the button. The various fasteners, screws and other components may be made from various stainless steel alloys. According to other exemplary embodiments, other suitable materials may be used for the various components of the folding knife.

While the detailed drawings and specific examples given describe various exemplary embodiments of the knife, they serve the purpose of illustration only. It is to be understood that the invention is not limited in its application to the details of construction and the arrangements of components set forth in the preceding description or illustrated in the drawings. Furthermore, other substitutions, modifications, changes, and omissions may be made in the design, operating conditions, and arrangements of the exemplary embodiments without departing from the scope of the invention as expressed in the appended claims.

What is claimed is:

1. A skinning knife, comprising:
a handle;
a blade carrier coupled to the handle, the blade carrier including a mount having a mounting surface, a boss extending outward from the mounting surface, and a spring including a front portion, a middle portion, and a rear portion, the front portion secured to the mount proximate a front end of the spring, the middle portion bent outward from the front portion and the rear portion, and the rear portion including a free end of the spring movable relative to the mount;
a button coupled to the rear portion of the spring and configured for actuation by a user to move the rear end of the spring; and
a blade including a sharpened edge, a body, and a slot formed through the body, the slot extends in a longitudinal direction from a front end to a rear end and includes a narrow portion of a first width and a wide portion of a second width greater than the first width, the narrow portion includes the front end of the slot and the wide portion includes the rear end of the slot;

wherein, in a first mode of operation, the blade is secured to the blade carrier with the boss positioned in the narrow portion of the slot and the engaging the front end of the slot and the middle portion of the spring positioned in the wide portion of the slot and engaging the rear end of the slot; and wherein, in a second mode of operation, the blade is removed from the blade carrier by depressing the button so that the middle portion of the spring is moved out of engagement with the rear end of the slot and allowing the boss to be moved out of engagement with the front end of the slot.

2. The skinning knife of claim 1, wherein the middle portion of the spring includes a first leg and a second leg, with the first leg bent at a first angle relative to the front portion of the spring and the second leg bent at a second angle relative to the rear portion of the spring.

3. The skinning knife of claim 2, wherein the first angle is less than the second angle.

4. The skinning knife of claim 3, wherein the mount includes an aperture, and wherein the middle portion of the spring is positioned within the aperture.

5. The skinning knife of claim 4, wherein the blade includes a top edge and a bottom portion of the cutting edge, the top edge is spaced apart from a top of the slot by a first distance and the bottom portion of the cutting edge is spaced apart from a bottom of the slot by a second distance greater than the first distance;

wherein the button includes a bottom edge spaced apart from a top edge of the spring by a third distance less than the second distance so that the blade can only be secured to the mount with the top edge of the blade adjacent the bottom edge of the button.

6. The skinning knife of claim 1, wherein the mount includes an aperture, and wherein the middle portion of the spring is positioned within the aperture.

7. The skinning knife of claim 6, wherein the blade includes a top edge and a bottom portion of the cutting edge, the top edge is spaced apart from a top of the slot by a first distance and the bottom portion of the cutting edge is spaced apart from a bottom of the slot by a second distance greater than the first distance;

wherein the button includes a bottom edge spaced apart from a top edge of the spring by a third distance less than the second distance so that the blade can only be secured to the mount with the top edge of the blade adjacent the bottom edge of the button.

8. The skinning knife of claim 1, wherein the blade includes a top edge and a bottom portion of the cutting edge, the top edge is spaced apart from a top of the slot by a first distance and the bottom portion of the cutting edge is spaced apart from a bottom of the slot by a second distance greater than the first distance;

wherein the button includes a bottom edge spaced apart from a top edge of the spring by a third distance less than the second distance so that the blade can only be secured to the mount with the top edge of the blade adjacent the bottom edge of the button.

9. The skinning knife of claim 1, wherein the blade carrier is pivotally coupled to the handle.

10. The skinning knife of claim 1, wherein the blade carrier is rigidly coupled to the handle.

11. The skinning knife of claim 1, wherein the boss includes a narrow portion of a third width and a wide portion of a fourth width greater than the first width and the third width, the narrow portion positioned between the mounting surface and the wide portion; and wherein, in the first mode of operation, the narrow portion of the boss is positioned in the narrow portion of the slot so that the wide portion of the boss overlaps a portion of the body of the blade adjacent the narrow portion of the slot.

12. The skinning knife of claim 11, wherein the middle portion of the spring includes a first leg and a second leg, with the first leg bent at a first angle relative to the front portion of the spring and the second leg bent at a second angle relative to the rear portion of the spring.

13. The skinning knife of claim 12, wherein the first angle is less than the second angle.

14. The skinning knife of claim 13, wherein the blade includes a top edge and a bottom portion of the cutting edge, the top edge is spaced apart from a top of the slot by a first distance and the bottom portion of the cutting edge is spaced apart from a bottom of the slot by a second distance greater than the first distance;

wherein the button includes a bottom edge spaced apart from a top edge of the spring by a third distance less than the second distance so that the blade can only be secured to the mount with the top edge of the blade adjacent the bottom edge of the button.

15. The skinning knife of claim 1, wherein the rear end of the slot is rounded.

* * * * *